(12) United States Patent
Bianco

(10) Patent No.: US 9,188,474 B2
(45) Date of Patent: Nov. 17, 2015

(54) LEVEL DETECTOR/TRANSMITTER SYSTEM

(71) Applicant: James S. Bianco, Suffield, CT (US)

(72) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 362 days.

(21) Appl. No.: 13/763,778

(22) Filed: Feb. 11, 2013

(65) Prior Publication Data

US 2013/0233070 A1 Sep. 12, 2013

Related U.S. Application Data

(60) Provisional application No. 61/596,856, filed on Feb. 9, 2012.

(51) Int. Cl.
*G01F 23/00* (2006.01)
*G01F 23/28* (2006.01)
*G01F 23/296* (2006.01)

(52) U.S. Cl.
CPC .......... *G01F 23/296* (2013.01); *G01F 23/2962* (2013.01)

(58) Field of Classification Search
None
See application file for complete search history.

(56) References Cited

U.S. PATENT DOCUMENTS

| | | | | |
|---|---|---|---|---|
| 5,644,299 | A * | 7/1997 | Cruickshank | 340/617 |
| 5,755,136 | A * | 5/1998 | Getman et al. | 73/290 V |
| 6,053,041 | A * | 4/2000 | Sinha | 73/290 V |
| 6,397,656 | B1 * | 6/2002 | Yamaguchi et al. | 73/1.82 |
| 7,205,900 | B2 * | 4/2007 | Liu et al. | 340/604 |
| 7,277,020 | B2 * | 10/2007 | McCarthy et al. | 340/621 |
| 7,287,425 | B2 * | 10/2007 | Lagergren | 73/290 V |
| 7,370,527 | B2 * | 5/2008 | Miyagawa | 73/290 V |
| 7,562,570 | B2 * | 7/2009 | Peters | 73/290 V |
| 8,104,341 | B2 * | 1/2012 | Lagergren et al. | 73/290 V |
| 2003/0121325 | A1 * | 7/2003 | Ku et al. | 73/304 C |
| 2004/0036618 | A1 * | 2/2004 | Ku et al. | 340/618 |
| 2004/0173021 | A1 * | 9/2004 | Lizon et al. | 73/290 V |
| 2006/0169056 | A1 * | 8/2006 | Dockendorff et al. | 73/861.23 |
| 2009/0303059 | A1 * | 12/2009 | Von Lintzgy et al. | 340/621 |

* cited by examiner

*Primary Examiner* — Peter Macchiarolo
*Assistant Examiner* — Jermaine Jenkins
(74) *Attorney, Agent, or Firm* — Alix, Yale & Ristas, LLP

(57) ABSTRACT

A level detector mounts to a tank containing a liquid. The detector transmits and receives ultrasonic pulses. The pulses are processed by a microprocessor which periodically measures the liquid level of the tank. When the liquid level reaches a pre-established level, a cell phone automatically transmits data to a remote location. A schedule for emptying the tank is generated by a server at the remote location. A service man uses the schedule to visit the tank location and empty the tank. In addition, a portable charger/calibrator is mounted to the level detector to charge the power supply of the detector and calibrate the liquid level.

19 Claims, 10 Drawing Sheets

LEVEL DETECTOR/TRANSMITTER SYSTEM

CROSS-REFERENCE TO RELATED APPLICATION

This application claims the priority of U.S. Provisional Patent Application No. 61/596,856 filed on Feb. 9, 2012, the disclosure of which is incorporated by reference in its entirety.

BACKGROUND

This disclosure relates generally to devices and methods for determining the liquid level in a tank. More particularly, this disclosure relates to electronic devices for automatically determining the liquid level in a tank.

For applications to which the present disclosure relates, waste oil from restaurants and food preparation facilities has now become a significant source of fuel. The waste oil is typically stored in tanks at the restaurant or facility. When a sufficient quantity of waste oil has been accrued, the waste oil is picked up and transferred to a tank on a truck. The waste oil is taken to a refining facility wherein the waste oil is filtered and/or otherwise treated to produce fuel suitable for usage.

One of the recurring issues is to schedule the trucks and pickup events so that a proper amount of waste oil is on hand for pickup. Economic considerations dictate that there be sufficient quantities of waste oil available for pickup subject to the limiting parameters that the pickup should not be scheduled beyond the point when the waste oil tank is full of waste oil.

SUMMARY

Briefly stated, the level detector/transmitter system comprises a level detector which includes a housing adapted to mount to a tank for liquid having a level within the tank. The detector also comprises a power supply, a microprocessor, a cell phone in communication with the microprocessor and an ultrasonic transceiver adapted to transmit pulses and receive echoes of the pulses and to transmit signals relating to the pulses to the microprocessor. The microprocessor processes the data to measure the liquid level of the tank. The microprocessor also regulates the time between measurement of the liquid level in the tank and controls the operation of the cell phone for transmitting data indicative of the liquid level in the tank when the liquid level reaches a pre-established threshold. The detector/transmitter system comprises a portable charger/calibrator which is adapted to mount onto the level detector and to charge the power supply of the level detector, as well as to calibrate the liquid level as measured by the microprocessor of the detector.

The portable charger/calibrator comprises a plurality of switches indicative of various level values of the tank. The detector comprises a pair of contacts and the portable charger/calibrator comprises a pair of contacts which engage the contacts of the liquid detector to provide electrical communication therewith. The portable charger/calibrator includes a charge lamp for indicating the charge status of the level detector.

The detector/transmitter system also employs a remote server which receives data from the cell phone of the level detector and generates a schedule for a stop for emptying and transporting liquid from the liquid container tank. The power supply is monitored and the microprocessor activates the cell phone to transmit a signal indicative of a low power supply. The microprocessor transforms the level detector to a sleep mode between measurements.

A level detector/transmitter system for automatically measuring the liquid level of the tank also may employ two ultrasonic transceivers each adapted to transmit pulses and receive echoes of the pulses. The signals relating to the pulses are transmitted to the microprocessor which derives a measurement of the liquid level of the tank. The microprocessor also regulates the time between measurement of the liquid level in the tank and controls the operation of the cell phone for transmitting data indicative of the liquid level in the tank when the liquid level reaches a pre-established threshold. After the liquid has been removed from the tank, a portable charger/calibrator is mounted onto the level detector to charge the power supply of the level detector and to calibrate the liquid level as measured by the microprocessor.

A method for monitoring a liquid level of the tank comprises employing a level detector to automatically, intermittently measure the liquid level of the tank. Upon the measured liquid level reaching a pre-established threshold, data is automatically transmitted to a remote location. The transmitted data is employed to determine when the liquid should be removed. The liquid is removed from the tank, the level detector is then charged, and the liquid level measurement of the level detector is then calibrated.

The data is preferably transmitted by a cell phone. The liquid level is preferably measured by emitting pulses from an ultrasonic transducer and processing the echo pulses in a microprocessor. The steps of charging and calibrating the level detector are immediately preceded by mounting a portable charger/calibrator to the level detector. The charger/calibrator is then removed at the conclusion of the charging and calibrating steps. The pre-established threshold level is approximately three-fourths of the volume of the tank in one embodiment.

In a preferred embodiment of the method, a multiplicity of level detectors each mounted to one of a plurality of tanks generate and transmit data to a central server. A service schedule for emptying the tanks is automatically generated by the server.

DETAILED DESCRIPTION

Figure 1:
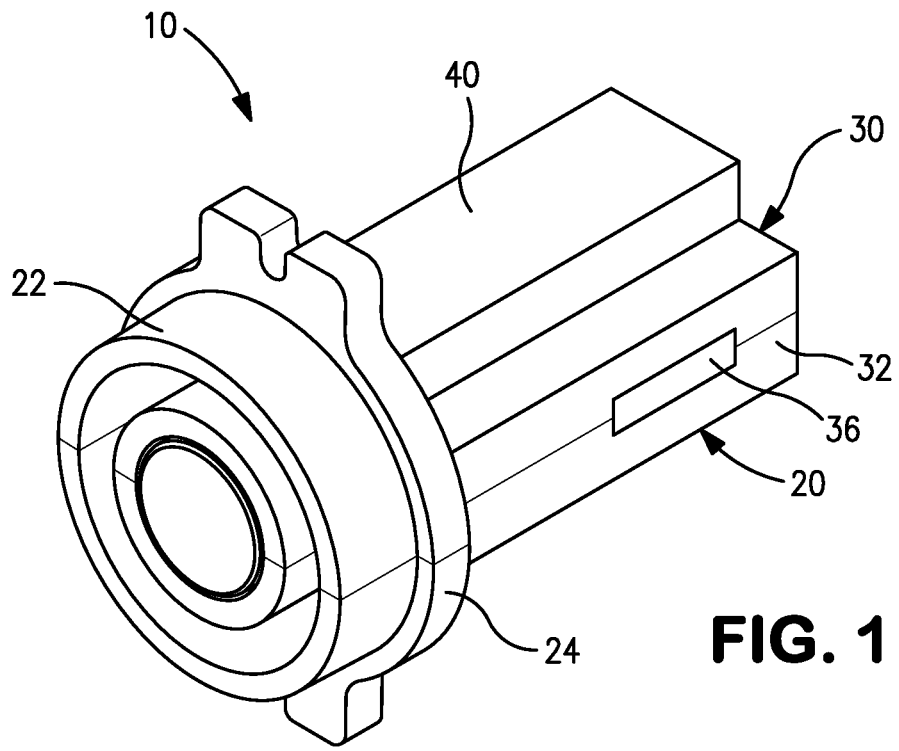
FIG. 1 is a perspective view of a level detector.
Figure 2:
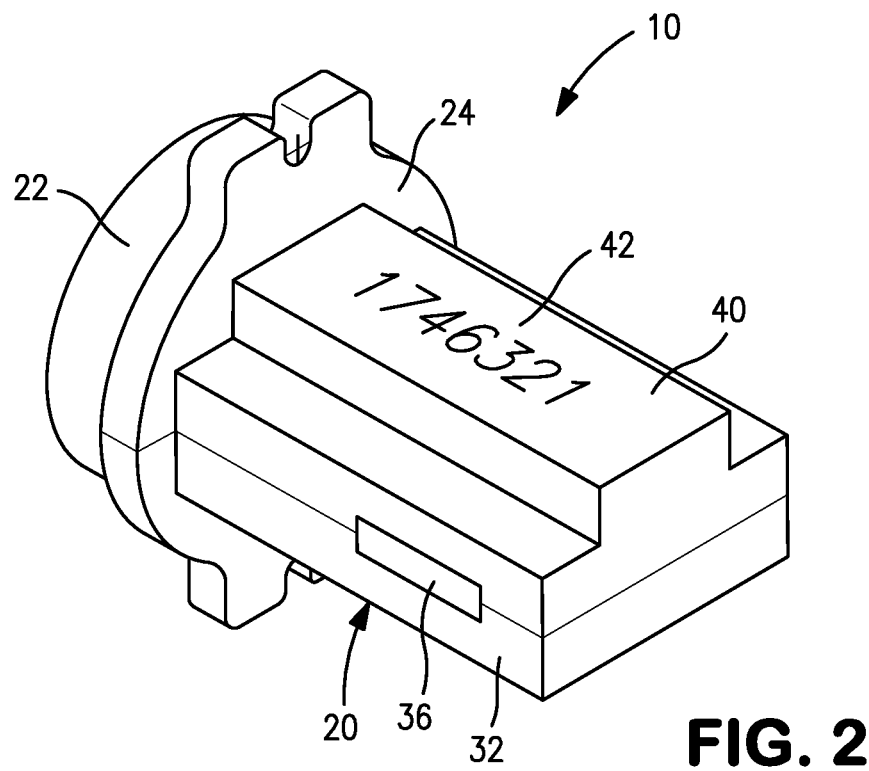
FIG. 2 is a perspective view of the level detector of FIG. 1, taken from a generally opposite position thereof.
Figure 3:
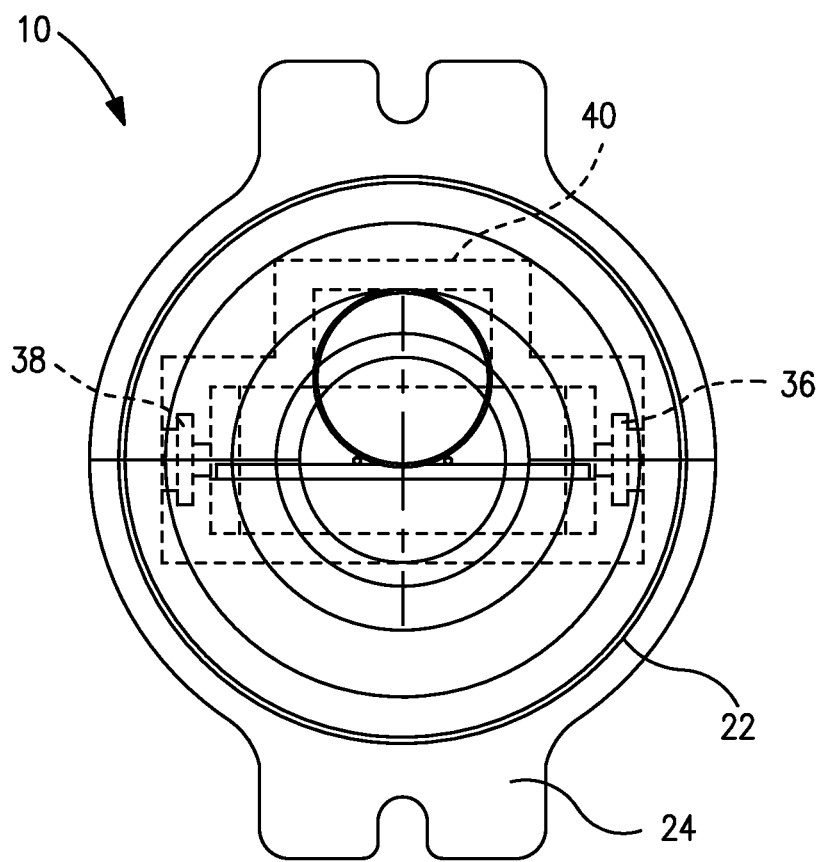
FIG. 3 is a frontal view, partly in phantom, of the level detector of FIG. 1.
Figure 4:
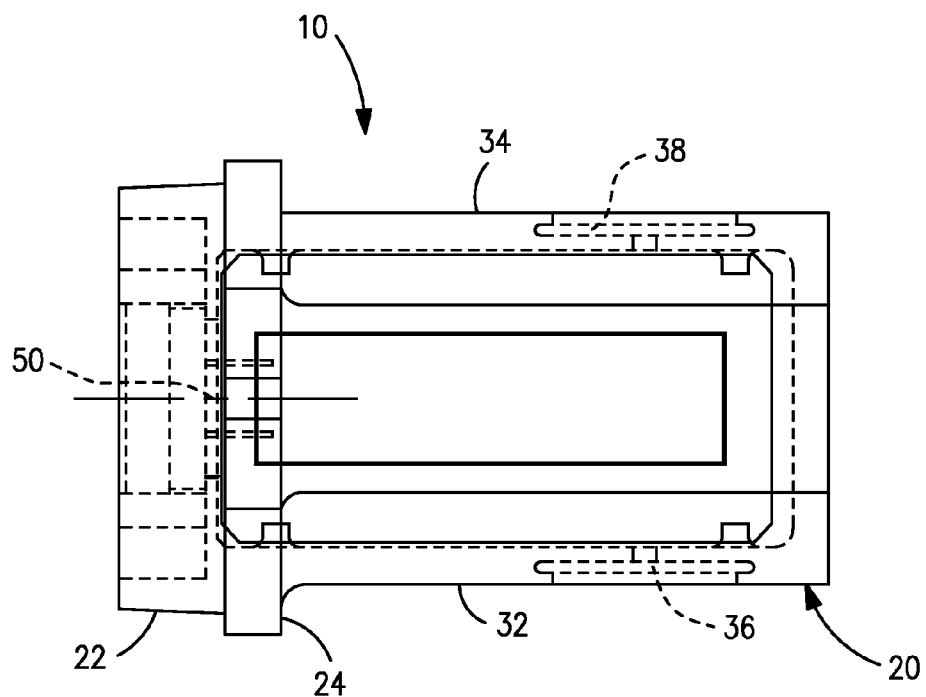
FIG. 4 is a top plan view, partly in phantom, of the level detector of FIG. 1.
Figure 5:
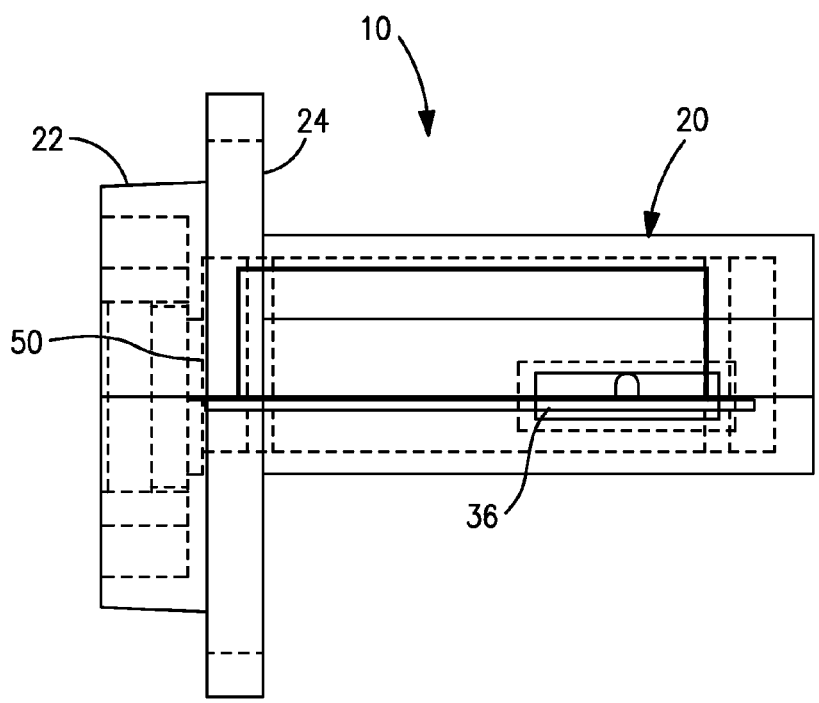
FIG. 5 is a side view, partly in phantom, of the level detector of FIG. 1.
Figure 6:
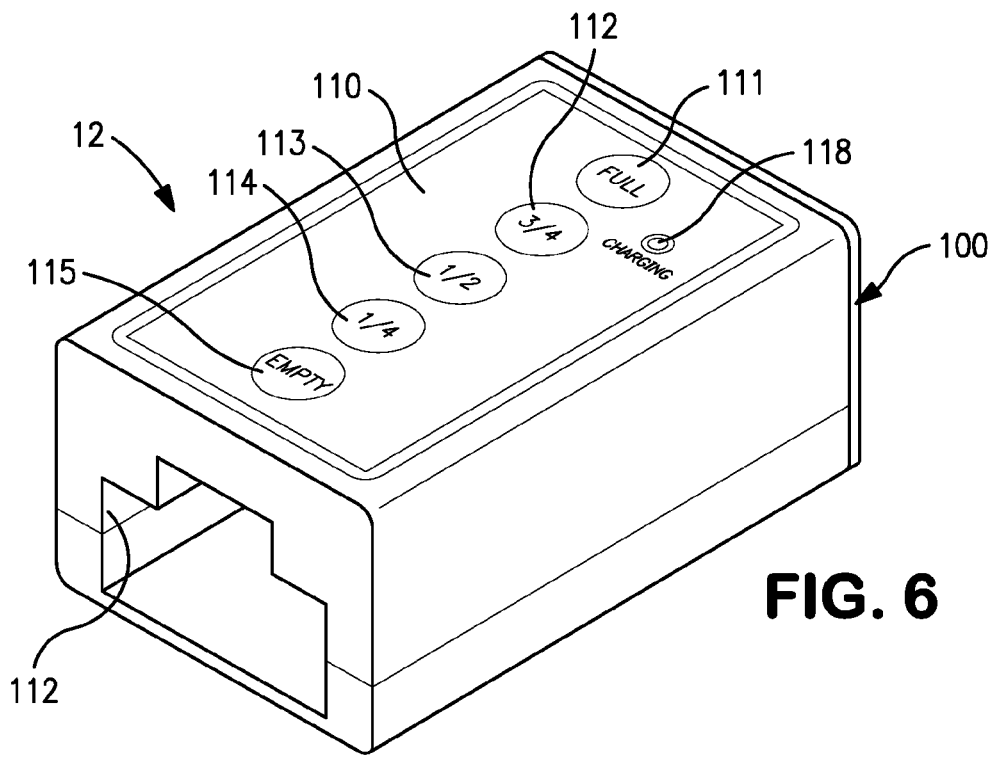
FIG. 6 is a perspective view of a portable charger/calibrator for the level detector of FIG. 1.

With reference to the drawings wherein like numerals represent like parts throughout the several figures, a level detector/transmitter system employs a level detector 10 and a portable charger/calibrator 12 which cooperate to calibrate the liquid level of a tank such as a waste oil tank, to monitor the level of the tank and to transmit data indicative of the liquid level of the tank. The charger 12 also functions to charge the battery of the level detector 10. A level indicator 10 is installed at each of the tanks to be serviced.

The level detector 10 comprises a housing 20 which includes a forward coupler 22 with a stop 24. Coupler 22 facilitates the mounting of the detector to a bung hole or a tapped opening at the top of a tank 14, schematically illustrated in FIG. 11. The housing 20 has a projecting portion 30 which, upon installation, extends exteriorly of the tank. The housing has a pair of sides 32 and 34 which exteriorly mount opposed conductive clips 36 and 38. The projecting portion also includes a centrally positioned rectangular rail 40. The rail is preferably affixed with a serial number 42 for identification purposes.

Figure 11:
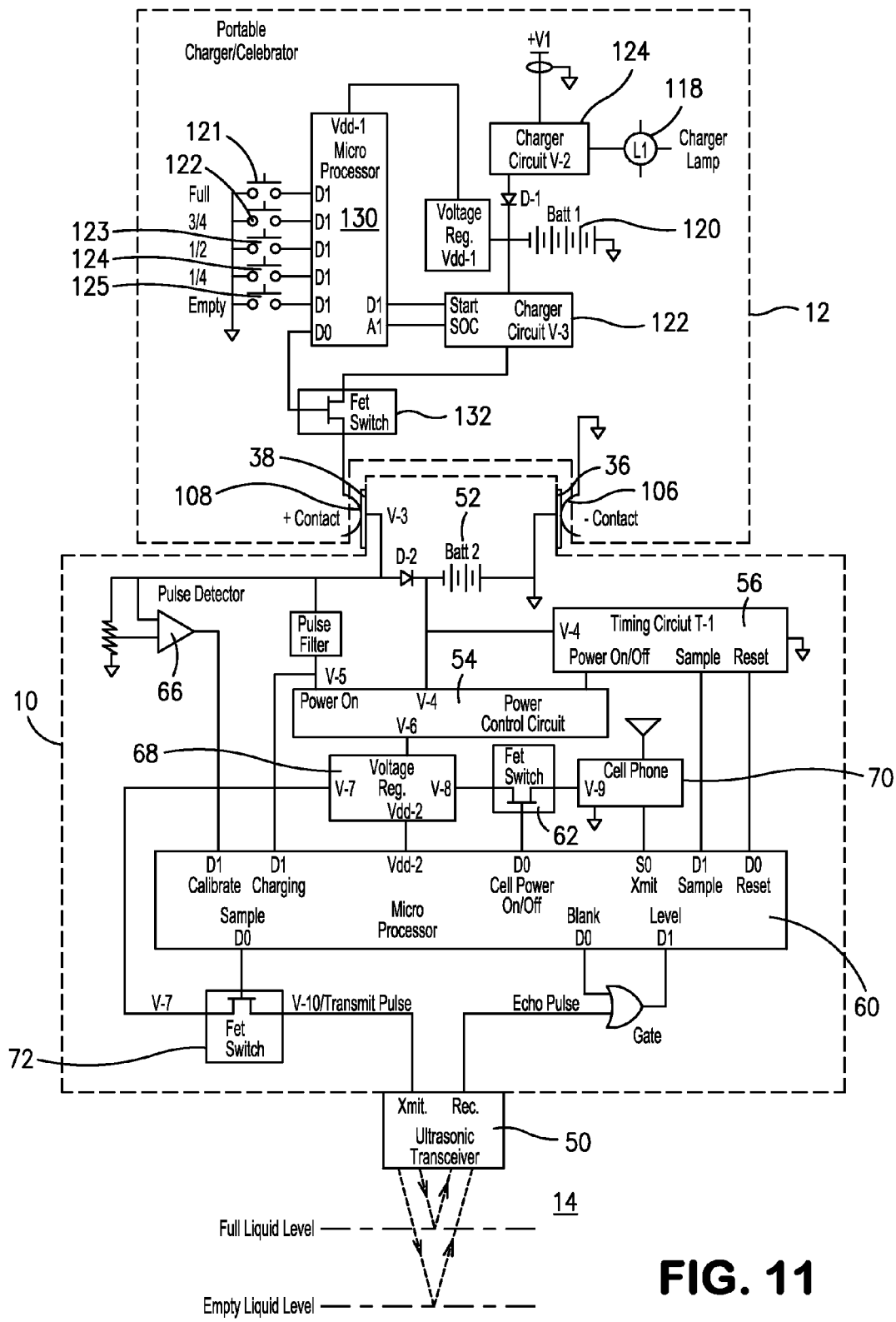
FIG. 11 is a schematic diagram of a level detector/transmitter system employing the portable charger/calibrator of FIG. 7.

With reference to FIG. 11, the level detector 10 employs at least one ultrasonic transceiver 50 which transmits ultrasonic pulses and receives their echoes from the surface of the liquid in the tank to determine the liquid level of the tank. The detector is powered by a pair of batteries 52 which connect to a power control circuit 54 and a timing circuit 56. A microprocessor 60 controls the power via a FET switch 62 to a cell phone 70 which intermittently transmits data indicative of liquid level readings and/or a low battery condition of the level detector 10. The contacts 36 and 38 communicate via a pulse detector 66 for calibrating and charging the level detector. A voltage regulator 68 supplies pulses via a FET switch 72 to the ultrasonic transceiver 50.

The echo pulses are then transmitted to the microprocessor 60 and processed to derive data indicative of the liquid level of the tank. The data is then transmitted via the cell phone 70 to a server 200 which is typically located at a remote site. The detector microprocessor 50 measures the time differential between the reflection and the return of the echo pulse and correlates the time differential with a pre-established tank level. The volume of the liquid level may thus be essentially calculated from the differences in the times of transmission and reception of a given pulse.

Figure 7:
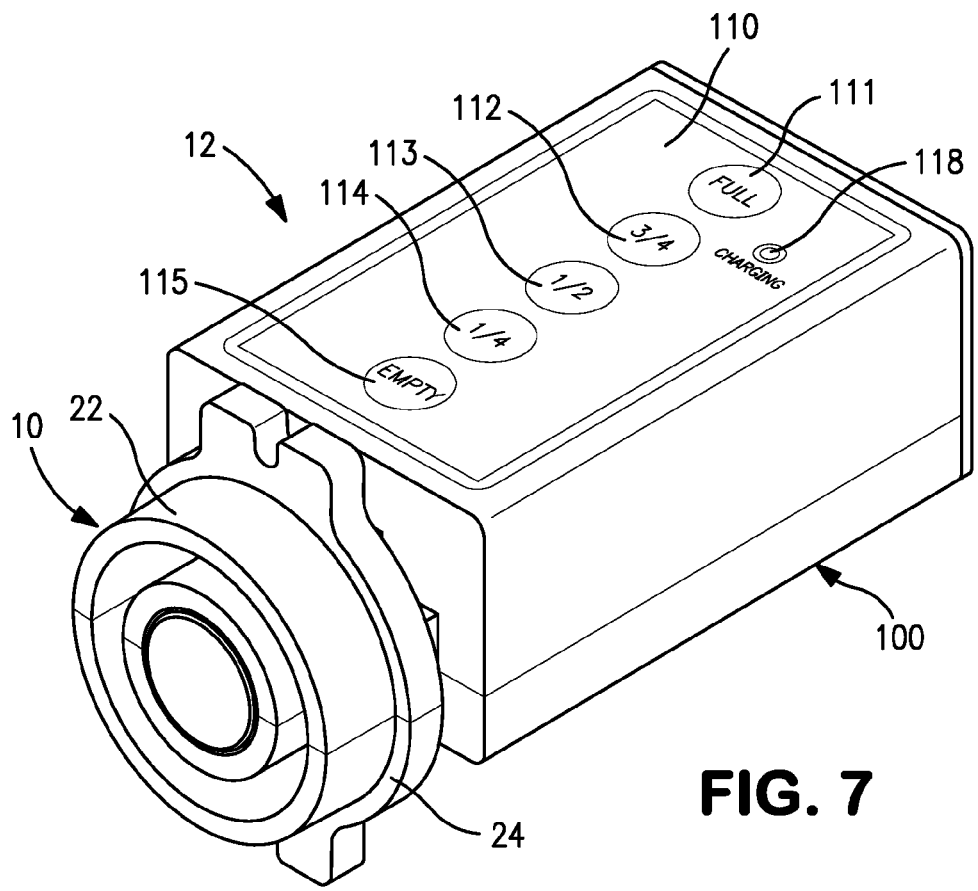
FIG. 7 is a perspective view of the portable charger/calibrator of FIG. 6 as mounted to the level detector of FIG. 1.
Figure 8:
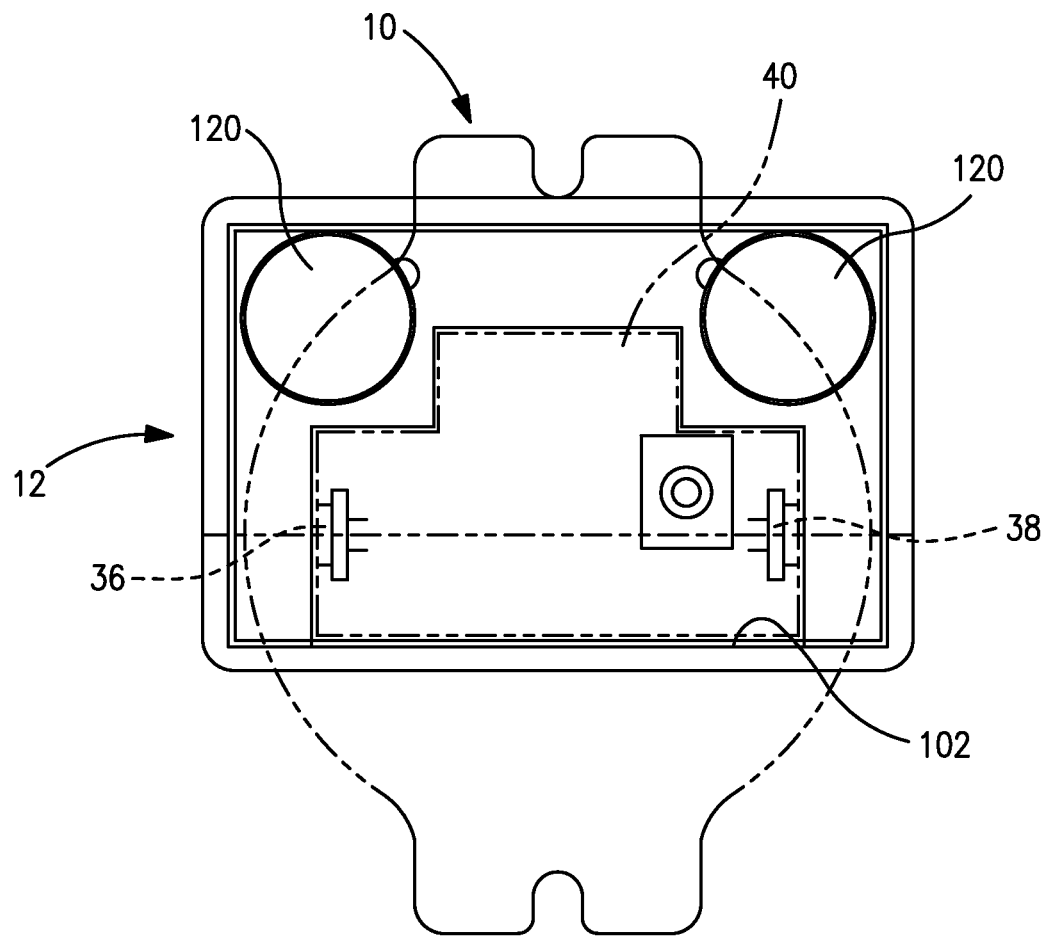
FIG. 8 is a rear view, partly in phantom, of the portable charger/calibrator and level detector of FIG. 7.
Figure 9:
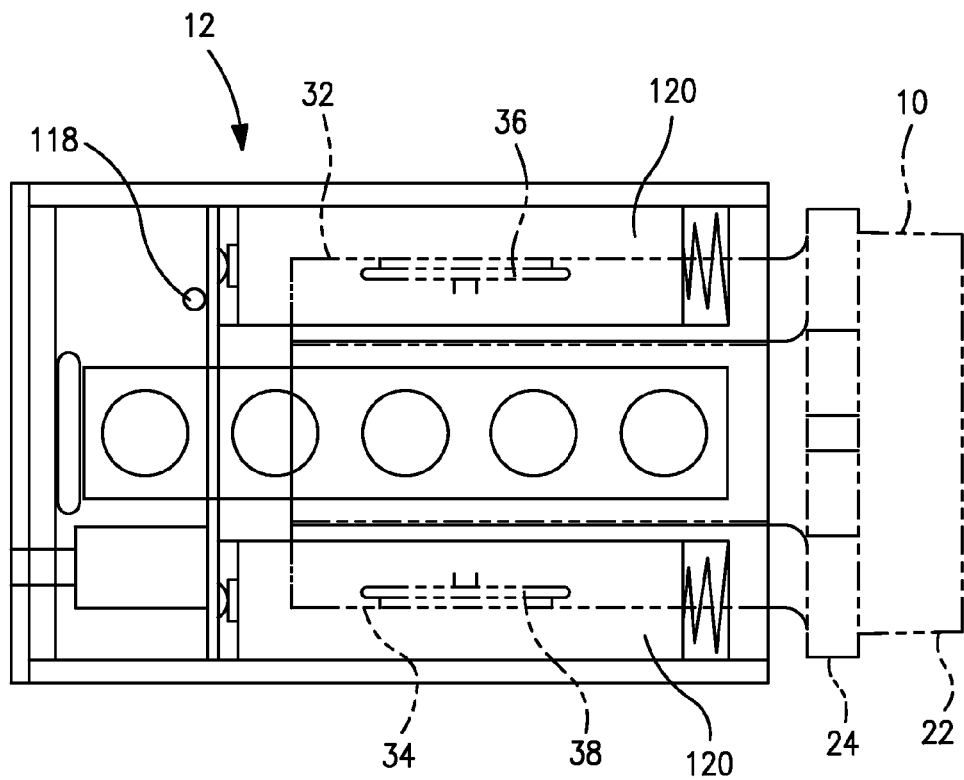
FIG. 9 is a top plan view, partly in phantom, of the portable charger/calibrator and level detector of FIG. 7.
Figure 10:
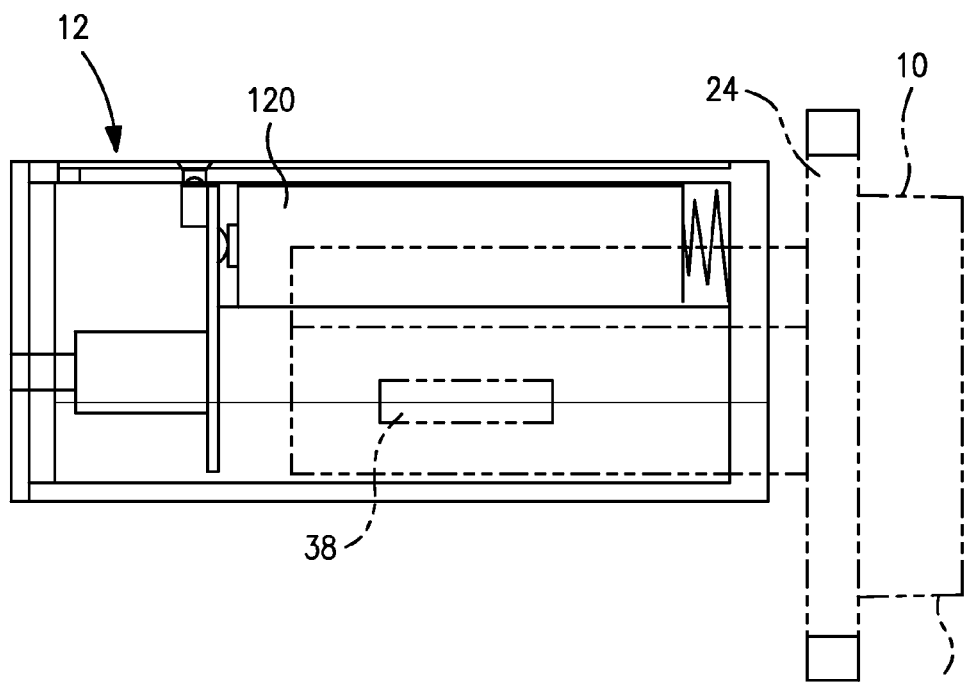
FIG. 10 is a side view, partly in phantom, of the portable charger/calibrator and level detector of FIG. 7.

The portable charger/calibrator 12 includes a housing 100 which has a slot 102 dimensioned to be generally complementary to the detector exterior housing portion 30 so that the portable charger/calibrator may mount over and receive the housing exterior portion 30 of the transmitter housing, as best illustrated in FIG. 7. The front face 110 of the charger/calibrator for one embodiment includes five buttons 111-115 which respectively designate full, ¾, ½, ¼ and empty tank conditions. Other level conditions and corresponding buttons are also possible. In addition, the front face includes a charging indicator 118 in the form of an LED. The indicator 118 pulses to indicate "charging" and illuminates in a steady state to indicate a "full charge".

Electrical communication between the charger/calibrator 12 and the level detector 10 is established via internal convex contacts 106 and 108 which respectively engage the exterior contacts 36 and 38 of the level detector. The portable charger/calibrator 12 includes a battery power supply 120 which communicates via a charging circuit 122 to charge the batteries 52 of the level detector when the contacts 36, 106 and 38, 108 are engaged and charging is required. The buttons 111-115 connect via corresponding switches 121-125 which provide input to the microprocessor 130. The microprocessor 130 has a port which communicates via a FET switch 132 for generating pulses for calibrating the level detector.

The portable charger/calibrator 12 is transportable by the driver of the service truck. The charger/calibrator 12 is charged through the charger circuit 124 via the cigarette lighter outlet of the service truck.

The level detector 10 is generally permanently mounted to the top of the waste oil tank. When the serviceman arrives at the site of the tank, he visually determines the approximate liquid level of the tank. He places the charger calibrator 12 over the level detector 10 and presses the appropriate button 111-115 on the face of the calibrator 12. Pulses are emitted from the transceiver 50 toward the surface of the liquid. The echo pulses are received by the transceiver, and the timing delay is determined to get a calibration point for the correlated level, for example, ¾ level full. After the tank is emptied, the serviceman presses the "empty" button 115 so that a calibration of the pulse time delay for the empty tank is determined. In this fashion, a calibration is made each time the tank is emptied, and the microprocessor 50 of the detector 10 is appropriately adjusted to reflect the calibration.

Figure 12:
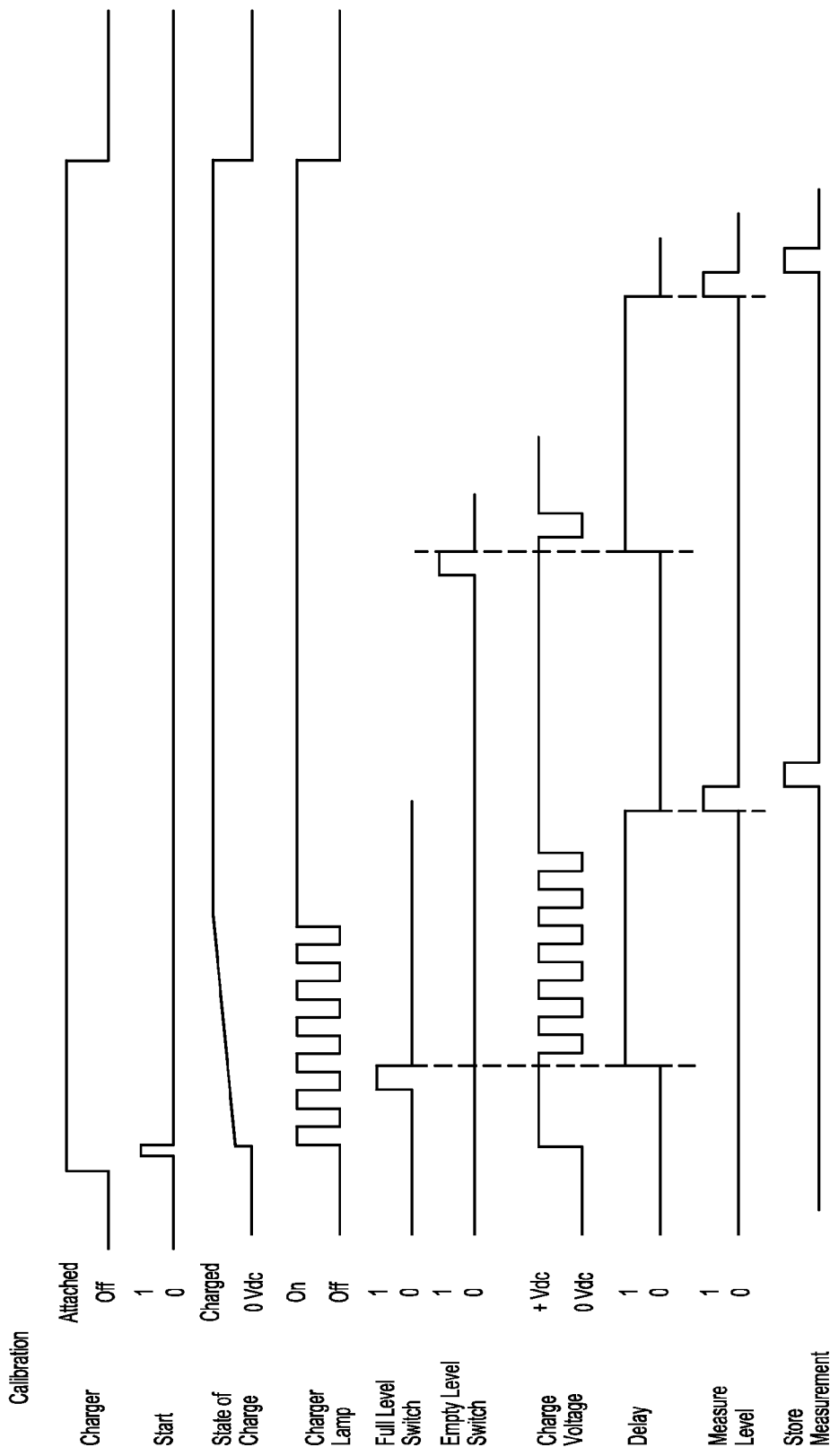
FIG. 12 is a timing diagram for the calibration function of the detector/transmitter system of FIG. 11.

With reference to FIG. 12, when the charger/calibrator 12 is attached to the level detector 10, the voltage level is established. A single pulse is then generated to indicate the start, and the charge gradually ramps up to a full charging condition for the level detector. A series of pulses are then indicated on the charger lamp 118 until the full charging condition has been established and a steady state illumination is generated.

The "full" level switch generates a series of pulses, and the "empty" level switch generates a single pulse. The time delays of the echo between the "full" level switch and the "empty" level switch are then determined. Pulses are generated at the end of the time delay. These pulses are then stored as measurements of the "full" level and the "empty" level condition of the tank level. Intermediate levels can also be mathematically derived.

Figure 13:
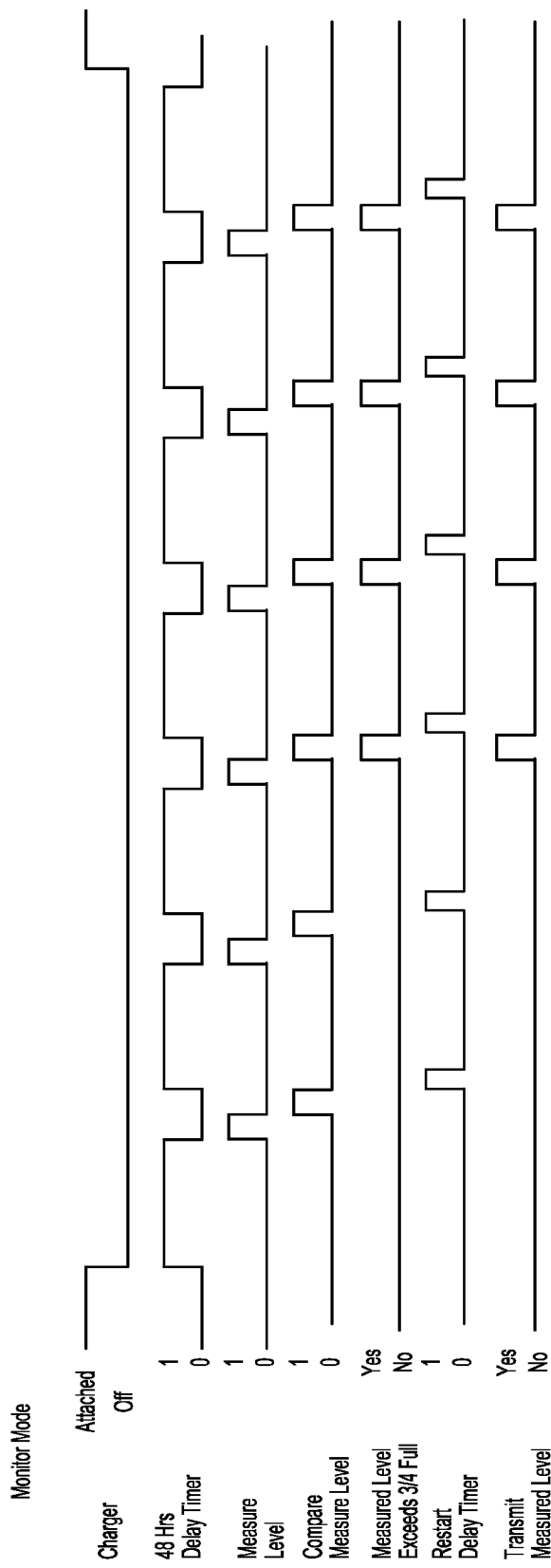
FIG. 13 is a timing diagram for the monitor mode function for the detector/transmitter system of FIG. 11.
Figure 14:
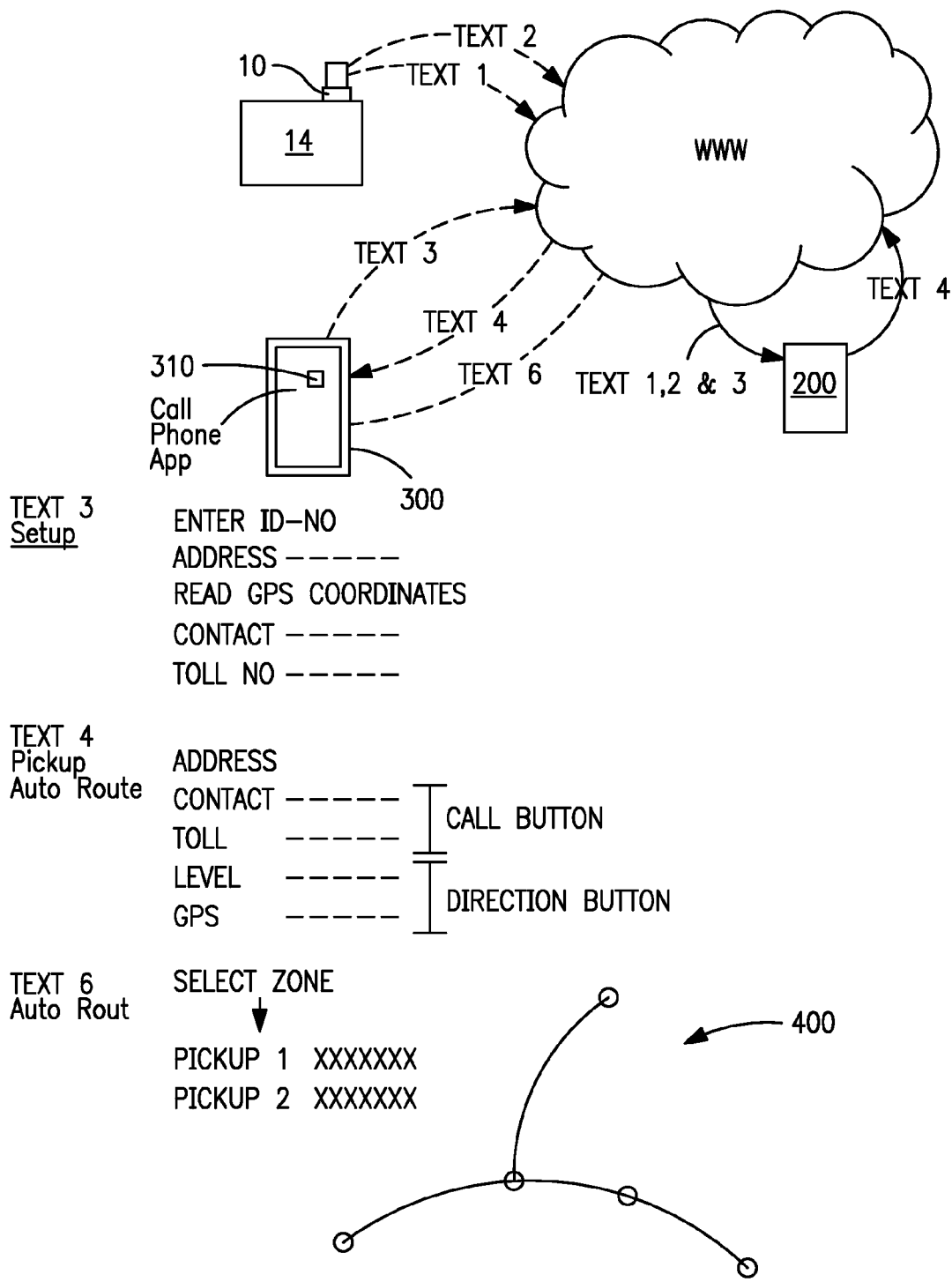
FIG. 14 is a schematic diagram for the flow and processing of data for the detector/transmitter system of FIG. 11.

With reference to FIG. 13, the level detector 10 does not continuously operate, but operates in an intermittent sleep/active mode to conserve power. After the charger calibrator 12 is attached, there is typically a 48 hour delay timer. Each 48 hours, the level detector via microprocessor 60 and ultrasonic transceiver 50 measures the level and compares the measured level with the correlated levels stored in the microprocessor. When the measured level exceeds ¾ full, for example, the restart delay timer is activated and data indicative of the measured level is transmitted via the cell phone 70 to the server 200 at pre-established time periods.

Prior to the serviceman returning to the truck, the charger/calibrator 12 is removed from the level detector 10 and the IP address or serial number 42 on the level detector is noted. The portable charger/calibrator 12 remains with the serviceman. The serviceman then transmits on his cell phone 300 the number together with the data and puts the number in an application 310 on his cell phone. The serviceman then together with the GPS position, the inputted name, address, contact and telephone number of the facility hits "send" on the cell phone application 310. The information is now in the database and available to the remote server 200.

It will be noted that when the charger/calibrator 12 is removed from the level detector 10, there is a pre-established time delay which is typically two days. At the end of the two-day period, the level detector 10 takes a measurement. If the tank is less than ¾ full, the detector essentially sleeps until the next reading, which is two days later. Other pre-established trigger levels may also be employed.

When the ¾ tank reading has been acquired, data information is transmitted to the server 200 together with the identification of the restaurant and the battery service condition of the transmitter. If the battery 52 is low, a battery level signal is transmitted immediately. The serviceman will then immediately go and pick up the waste oil and recalibrate and recharge the level detector 10. It will be appreciated that the level detector 10 is recalibrated (and potentially recharged) every time the tank is emptied.

In a preferred application of the detector/transmitter system, numerous level detectors 10 are installed in tanks at various locations. The data generated is transmitted via cell phone to a single remote server 200.

Based on the transmittal of information from each of the separate facilities, the server 200 will generate a route 400 together with GPS readings in electronic form and/a paper form so that the serviceman will be routed in the appropriate fashion to the various pick up points to empty the containers and collect the waste oil. The serviceman will then employ the portable charger/calibrator 12 to charge and calibrate each level detector after liquid has been removed.

While a preferred embodiment of the foregoing has been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A level detector/transmitter system comprising:
a level detector comprising a housing adapted to mount to a tank for a liquid having a level, a power supply, a microprocessor, a cell phone in communication with said microprocessor and an ultrasonic transceiver adapted to transmit pulses and receive echoes of said pulses and transmit signals relating to said pulses to the microprocessor to measure the liquid level of the tank, said microprocessor regulating a time interval between successive measurements of the liquid level in the tank, and controlling the operation of the cell phone for transmitting data indicative of the liquid level in the tank when the liquid level reaches a pre-established threshold; and
a portable charger/calibrator adapted to mount onto the level detector and to charge the power supply of the level detector and to calibrate the liquid level as measured by the microprocessor of the detector.

2. The detector/transmitter system of claim 1 wherein said portable charger/calibrator comprises a plurality of switches indicative of various level values of a tank.

3. The detector/transmitter system of claim 1 wherein said detector comprises a pair of contacts, and said portable charger/calibrator comprises a pair of contacts which engage the contacts of the level detector to provide electrical communication therewith.

4. The detector/transmitter system of claim 1 wherein said portable charger/calibrator includes a charge lamp for indicating the charge status of the level detector.

5. The detector/transmitter system of claim 1 and further comprising a server which receives data from said cell phone of said level detector and generates a schedule for a stop for emptying and transporting liquid from the liquid tank.

6. The detector/transmitter system of claim 1, wherein the power supply is monitored and the microprocessor activates the cell phone to transmit a signal indicative of a low power supply.

7. The detector/transmitter system of claim 1 wherein said microprocessor transforms said level detector to a sleep mode between measurements.

8. A level detector/transmitter system for automatically measuring the liquid level of a tank comprising:
a level detector comprising a housing, a power supply, a microprocessor, a cell phone in communication with said microprocessor, and at least one ultrasonic transceiver each adapted to transmit pulses and receive echoes of said pulses and transmit signals relating to said pulses to the microprocessor to measure the liquid level of the tank, said microprocessor regulating a time interval between successive measurements of the liquid level in the tank, and controlling the operation of the cell phone for transmitting data indicative of the liquid level in the tank; and
a portable charger/calibrator adapted to mount onto the level detector and to charge the power supply of the level detector and to calibrate the liquid level as measured by the microprocessor of the detector.

9. The detector/transmitter system of claim 8 wherein said portable charger/calibrator comprises a plurality of switches indicative of various level values of a tank.

10. The detector/transmitter system of claim 8 wherein said level detector comprises a pair of contacts, and said portable charger/calibrator comprises a pair of contacts which engage the contacts of the level detector to provide electrical communication therewith.

11. The level detector/transmitter system of claim 8 and further comprising a server which receives data from said cell phone of said level detector and generates a schedule for a stop for emptying and transporting liquid from the liquid container tank.

12. The level detector/transmitter system of claim 8, wherein the power supply is monitored and said microprocessor activates said cell phone to transmit a signal indicative of a low power supply.

13. The detector/transmitter system of claim 8 wherein said microprocessor transforms said level detector to a sleep mode between measurements.

14. A method for monitoring a liquid level of a tank comprising:
employing a level detector to automatically intermittently measure the liquid level of the tank;
when the liquid level reaches a pre-established threshold, automatically transmitting data indicative of the measured liquid level to a remote location;
using the transmitted data to determine a schedule when the liquid in the tank should be removed;
removing liquid from the tank;
mounting a portable charger/calibrator to the level detector and subsequently:
charging the level detector; and
calibrating the liquid level measurement of the level detector.

15. The method of claim 14 wherein said data is transmitted by means of a cell phone.

16. The method of claim 14 wherein the liquid level is measured by emitting pulses from an ultrasonic transducer and processing the echo of said pulses in a microprocessor.

17. The method of claim 14 further comprising removing said charger/calibrator at the conclusion of the charging and calibrating steps.

18. The method of claim 14 wherein said pre-established threshold level is approximately ¾ of the volume of the tank.

19. The method of claim 14 further comprising employing a multiplicity of level detectors, each mounted to one of a plurality of tanks, and further comprising using data indicative of the level of the tanks to generate a service schedule for emptying the tanks.

* * * * *